(No Model.) 2 Sheets—Sheet 1.
J. L. HAWKINS.
CULINARY BOILER.
No. 467,480. Patented Jan. 19, 1892.
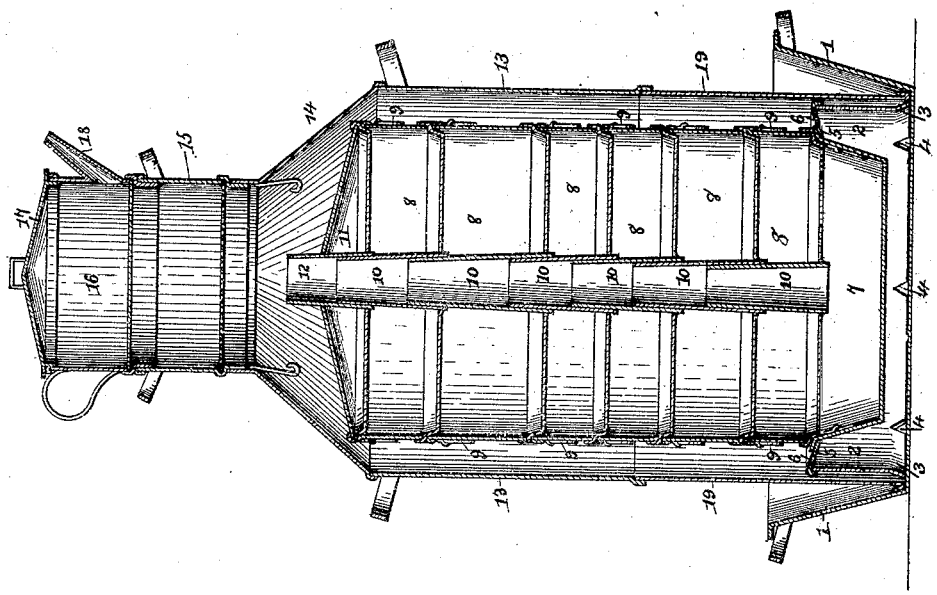
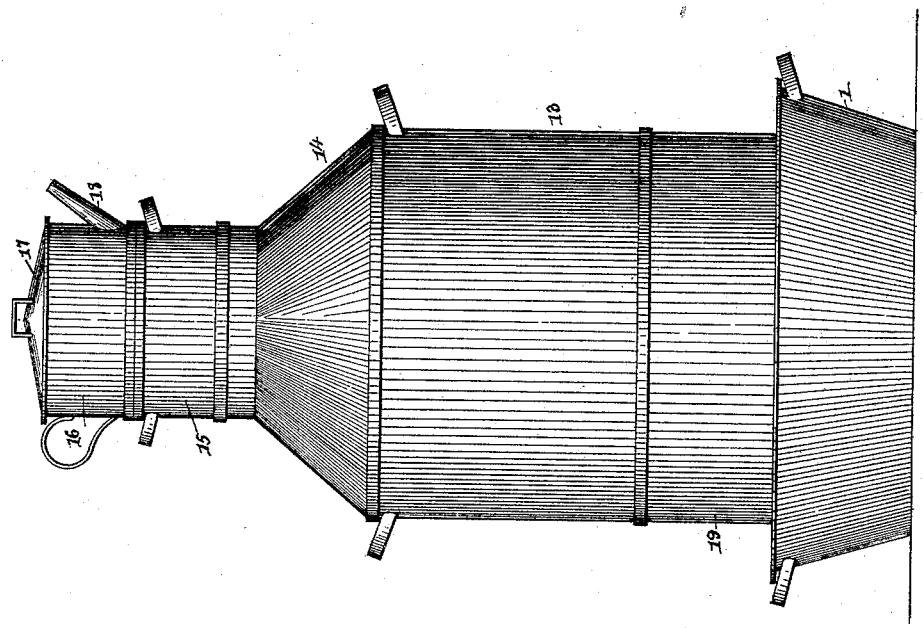
Witnesses:
Jas. K. McCathran
W. S. Duvall
Inventor
James L. Hawkins
By his Attorneys,
C. A. Snow & Co.

(No Model.) 2 Sheets—Sheet 2.
J. L. HAWKINS.
CULINARY BOILER.
No. 467,480. Patented Jan. 19, 1892.
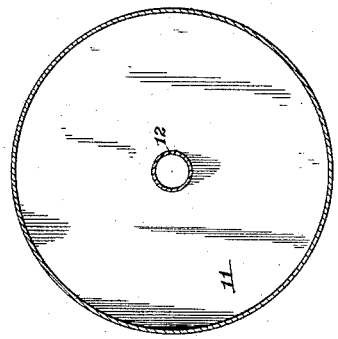
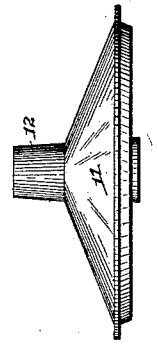
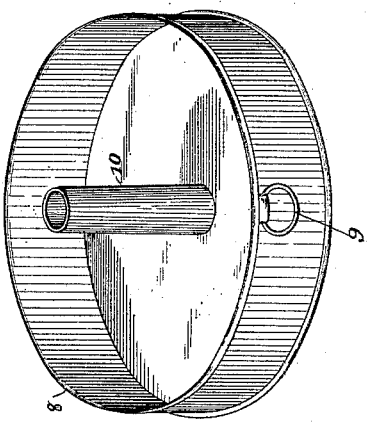
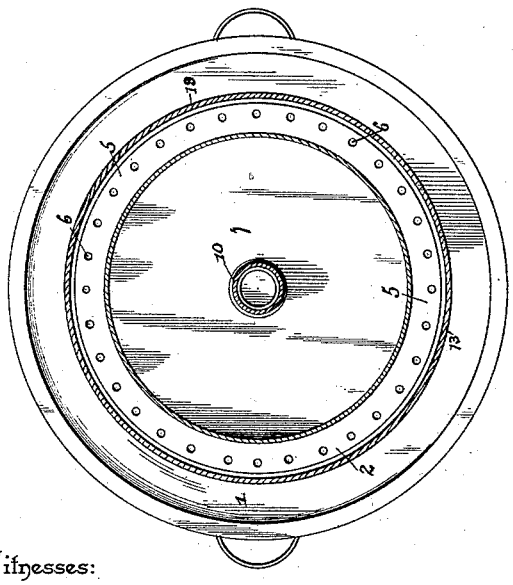
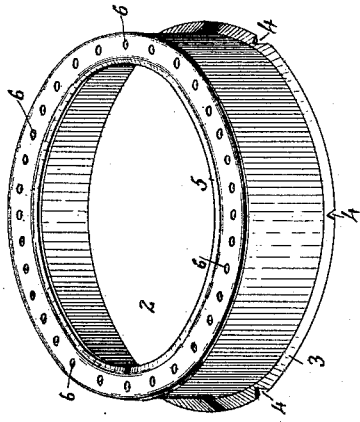
Witnesses:
Jas. K. McCathran
W. S. Duvall
Inventor
James L. Hawkins
By his Attorneys,
C. A. Snow & Co.

UNITED STATES PATENT OFFICE.

JAMES L. HAWKINS, OF FRESNO, CALIFORNIA.

CULINARY BOILER.

SPECIFICATION forming part of Letters Patent No. 467,480, dated January 19, 1892.

Application filed June 6, 1891. Serial No. 395,405. (No model.)

*To all whom it may concern:*

Be it known that I, JAMES L. HAWKINS, a citizen of the United States, residing at Fresno, in the county of Fresno and State of California, have invented a new and useful Culinary Boiler, of which the following is a specification.

This invention relates to improvements in steam-cookers or culinary boilers; and the objects in view are to provide a cheap and simple construction of cooker, adapted for simultaneously cooking various vegetables, eggs, coffee, &c., all within the same apparatus, and yet in an independent manner; to provide means for adjusting the cooker for two or more vegetables, and to do the entire cooking by means of steam.

Various other objects of the invention will appear in the following description, and the novel features thereof will be particularly pointed out in the claims.

Referring to the drawings, Figure 1 is a side elevation of a steam-cooker constructed in accordance with my invention. Fig. 2 is a vertical longitudinal section. Fig. 3 is a transverse section. Fig. 4 is a detail in perspective of the perforated steam-distributing ring. Fig. 5 is a detail of the cover for the series of cooking-cylinders. Fig. 6 is a transverse section of the same. Fig. 7 is a detail of one of the cylinders.

Like numerals of reference indicate like parts in all the figures of the drawings.

In practicing my invention I employ a base-pan 1, cylindrical in plan, and in the same mount in a removable manner the steam-distributing ring 2, provided with a flared base 3, notched at intervals, as at 4, and adapted to rest upon the bottom of the base-pan, which, as will hereinafter appear, is the water-reservoir. The upper edge of the steam-distributing ring is provided with an inwardly-disposed annular horizontal flange 5, at intervals having perforations 6. Supported within this flange is an egg-boiling pan and water-receiving tray 7, which fits down removably and snugly within the ring.

8 designates a cylindrical vegetable-receiving pan provided at opposite sides with rings 9, and having its bottom provided with a central slightly conical steam-pipe 10, extending a short distance above the wall of the pan. A series of these pans are employed, they preferably being of various sizes and piled one upon the other in a vertical tier. When assembled in vertical series, the upper end of the pipe of each pan takes into the lower end of the pipe of the pan above. The entire series of pans is surmounted by a conical cover 11, having a central pipe-section 12 extending therefrom.

13 designates the outer jacket or casing of the steam-cooker, and the same is provided with a truncated cone-shaped crown or dome 14, in which is seated an ordinary steamer 15, the bottom of which is reduced to fit the mouth of the dome, as shown. The bottom of the steamer is perforated, as is usual, and the steamer has mounted in its upper end a tea pot or kettle 16, the lower end of which is reduced to fit the upper end of the steamer in a removable manner, said tea pot or kettle being provided with a cover 17 and a spout 18. The jacket is preferably formed of two transverse sections, the lower section 19 receiving the upper section and being removable therefrom for the purpose of decreasing the height of the shell, whereby a smaller number of receiving-pans may be employed and yet no steam-space allowed at the upper end of the shell.

In use the base-pan 1 is filled about two-thirds full with water, as is also the pan 7, and into the latter may be introduced eggs for the purpose of boiling. The various vegetable-receiving pans are now filled with their respective vegetables and piled one upon the other, each pan serving as a cover for the pan below, and the several steam-pipes of the pans combining to form a vertical steam-pipe leading from the pan 7 to a point slightly below the foraminous bottom of the steamer. The steam, after passing through the pipe and becoming condensed, returns down the sides of shell to the pan 1. Steam is also generated in the pan 1 and, passing into the distributing-ring, passes through the various perforations of the steam-distributing ring and thence up around the sides of the vegetable-receiving pans.

From the above construction it will be apparent that eggs, vegetables of various kinds, meats, fruits, and coffee or tea may be simultaneously cooked all within the same device and yet independent of each other, so that their odors do not commingle or impregnate each other, and so that each when completed may be removed. By reason of the condensed steam flowing back to the pan 1 the latter is prevented from becoming dry, and hence requires no especial attention. By reason of confining and retaining the steam and causing it to circulate in the manner described it serves to heat a number of cooking utensils at one time, whereby I effect a saving in time, fuel, trouble of cooking, and succeed in cooking much better by the action of the steam than by the water.

Having described my invention, what I claim is—

1. In a steam-cooker, the combination, with the base pan or reservoir and a ring mounted therein and having at its upper end an internal annular perforated flange, of a series of cooking-pans mounted one upon the other and supported upon the ring, and a shell inclosing the pans and supported upon the base-pan, substantially as specified.

2. In a steam-cooker, the combination, with the reservoir and a series of vegetable-receiving pans piled one upon the other, of a removable shell inclosing the pans and mounted upon the base-pan, said shell being formed of two sections removably connected, substantially as specified.

3. In a steam-cooker, the combination, with the base-pan 1, the steam-distributing ring mounted therein and having a flared notched lower edge and at its upper end an annular perforated flange, and a removable pan mounted therein, of a series of vegetable-pans having their lower ends reduced so as to fit one within the other when piled vertically, and each provided with a central slightly-conical steam-pipe deeper than the pan, the shell encircling the same mounted in the base-pan and having a conical dome, the steamer mounted in the dome, the tea-pot mounted in the steamer, and the cover mounted on the series of vegetable-pans and having a central pipe aligning with those of the pans, substantially as specified.

4. In a steam-cooker, the combination, with the base-pan, the ring mounted therein and having an upper perforated flange, and a pan mounted in the flange, of a series of vegetable-receiving pans supported above the pan in the ring and piled one upon the other, a cover for the uppermost pan, the pan and cover being provided with steam-pipes deeper than the cover or pan and connected together, and the outer shell encircling the vegetable-pans, substantially as specified.

5. In a steam-cooker, the combination, with the base pan or reservoir and a ring mounted therein and having at its upper end an internal annular perforated flange, of a series of cooking-pans smaller in diameter than the ring, mounted one upon the other and supported upon the ring at the inner side of the flange, and a shell inclosing the pans and the ring and supported upon the base-pan so as to have a space around the pans, with which space the steam arising through the perforations of the flange communicates, substantially as specified.

In testimony that I claim the foregoing as my own I have hereto affixed my signature in presence of two witnesses.

JAMES L. HAWKINS.

Witnesses:
JAMES G. WOFFORD,
HZ. AUSTIN.